United States Patent
Cippitani

[11] Patent Number: 5,931,335
[45] Date of Patent: *Aug. 3, 1999

[54] LIQUID PROPANE GAS TANKS AND, IN PARTICULAR TO CYLINDRICAL TANKS FOR VEHICLES

[76] Inventor: Luciano Cippitani, Via Reynolds, 2467, IT 04012, Cisterna di Latina, Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/553,689

[22] PCT Filed: Jun. 9, 1994

[86] PCT No.: PCT/IT94/00082

§ 371 Date: Jul. 29, 1996

§ 102(e) Date: Jul. 29, 1996

[87] PCT Pub. No.: WO94/29639

PCT Pub. Date: Dec. 20, 1994

[30] Foreign Application Priority Data

Jun. 10, 1993 [IT] Italy .................................. RM93A0381
Mar. 25, 1994 [IT] Italy .................................. RN94A0165

[51] Int. Cl.[6] .............................. B65D 8/02; B65D 25/38
[52] U.S. Cl. ...................... 220/724; 137/382; 220/213; 220/562
[58] Field of Search ..................................... 220/562, 582, 220/601, 608, 213, 252, 724, 725, 726, 727, 728, 564, 502; 137/583, 584, 382, 347

[56] References Cited

U.S. PATENT DOCUMENTS

| | | | |
|---|---|---|---|
| 1,469,646 | 10/1923 | Rowland | 220/724 |
| 1,572,727 | 2/1926 | Kerr | 220/727 X |
| 1,602,506 | 10/1926 | Rowland | 220/724 X |
| 1,876,188 | 9/1932 | Willoughby | 220/728 |
| 2,354,425 | 7/1944 | Kuhn | 220/601 X |
| 2,609,964 | 9/1952 | Cadwell | 220/724 |
| 2,673,010 | 3/1954 | Barrow | 137/382 |
| 2,679,332 | 5/1954 | Humbarger | 137/382 |
| 2,781,944 | 2/1957 | Clute | 220/728 X |
| 3,450,148 | 6/1969 | Mongelluzzo et al. | 137/382 |
| 3,827,595 | 8/1974 | Reynolds | 220/601 X |
| 3,963,144 | 6/1976 | Berwald | 220/725 X |
| 5,381,924 | 1/1995 | Kiefel | 220/378 X |

*Primary Examiner*—Stephen Castellano
*Assistant Examiner*—Niki M. Eloshway
*Attorney, Agent, or Firm*—Laurence R. Brown

[57] ABSTRACT

Liquid propane gas tanks for vehicles, and cylindrical tanks in particular, wherein end (1) of cylinder (2) is provided with a cavity (3) housing the valve group ring (4), or the valve rings in the case of the embodiment designed for the foreign market, shaped in such a manner as to fit perfectly inside the cavity; in the preferred embodiment, the cavity has walls (6) and (7) at right angles and placed in the curved end (1) of the cylinder (2) so as to be flush-mounted with the end (1) of cylinder (2).

5 Claims, 7 Drawing Sheets

LIQUID PROPANE GAS TANKS AND, IN PARTICULAR TO CYLINDRICAL TANKS FOR VEHICLES

BACKGROUND ART

The reason why cylindrical tanks for LPG (liquid propane gas) fuel systems for vehicles are so widespread is that, for many years now they have been the only type of fuel tank of this kind available. These cylindrical tanks feature the valve group ring located right in the middle of the tank or on the side of the cylindrical ferrule. The tank is generally located in the trunk against the rear seat back or in the space between the two rear wheels. The fact that the valve group and, even worse, the airtight chamber, are placed right in the middle creates an additional impediment, besides the tank itself, with the obvious reduction of the trunk's loading capacity and seeing that the airtight chamber often has projecting parts of its own this also entails the risk of damaging any luggage or packages one puts inside the trunk. Furthermore, in order to access the valve group, in case of need, it is necessary to empty the trunk of all its contents, given the position of the valve group right in the middle of the tank.

DISCLOSURE OF INVENTION

According to the present invention there is provided a cylindrical liquid propane gas tank with a cavity located on either one of the two ends capable of housing the valve group ring, or the rings for the single valves, in the case of the embodiment designed for the foreign market, which is shaped so as to fit perfectly inside the cavity. In this manner, the front of the cylindrical tank described herein will be totally free of any protruding parts, thus enabling a better exploitation of the trunk space. Furthermore, the recessed position of the valve grouping or valve rings and of the airtight chamber also allows the easy and safe passage of the pipes to the outside, exiting through a hole in the section above the wing. The recessed cavity housing the valve group is closed by an airtight cap that may be opened if the need arises to inspect the valve group or valves.

As described above, the cavity for housing the valve group or valves may be applied to one of the two ends of the tank in such a manner that the valve group, or valves in the case of tanks designed for the foreign market, are perfectly recessed. Obviously, such a cavity may also be located on the bottom of the front of the tank, at different angles, in which case the valve group or valves shall still be recessed and there will be no projecting parts. One of the alternative embodiments shall be provided with a transparent polycarbonate cover with holes provided with adequate seals through which pass the knobs for opening and closing the valve group, which knobs may be easily used to open or close the gas flow without opening the cover.

A specified embodiment of the invention will now be described by way of example with reference to the accompanying drawing in which.

Figure 1:
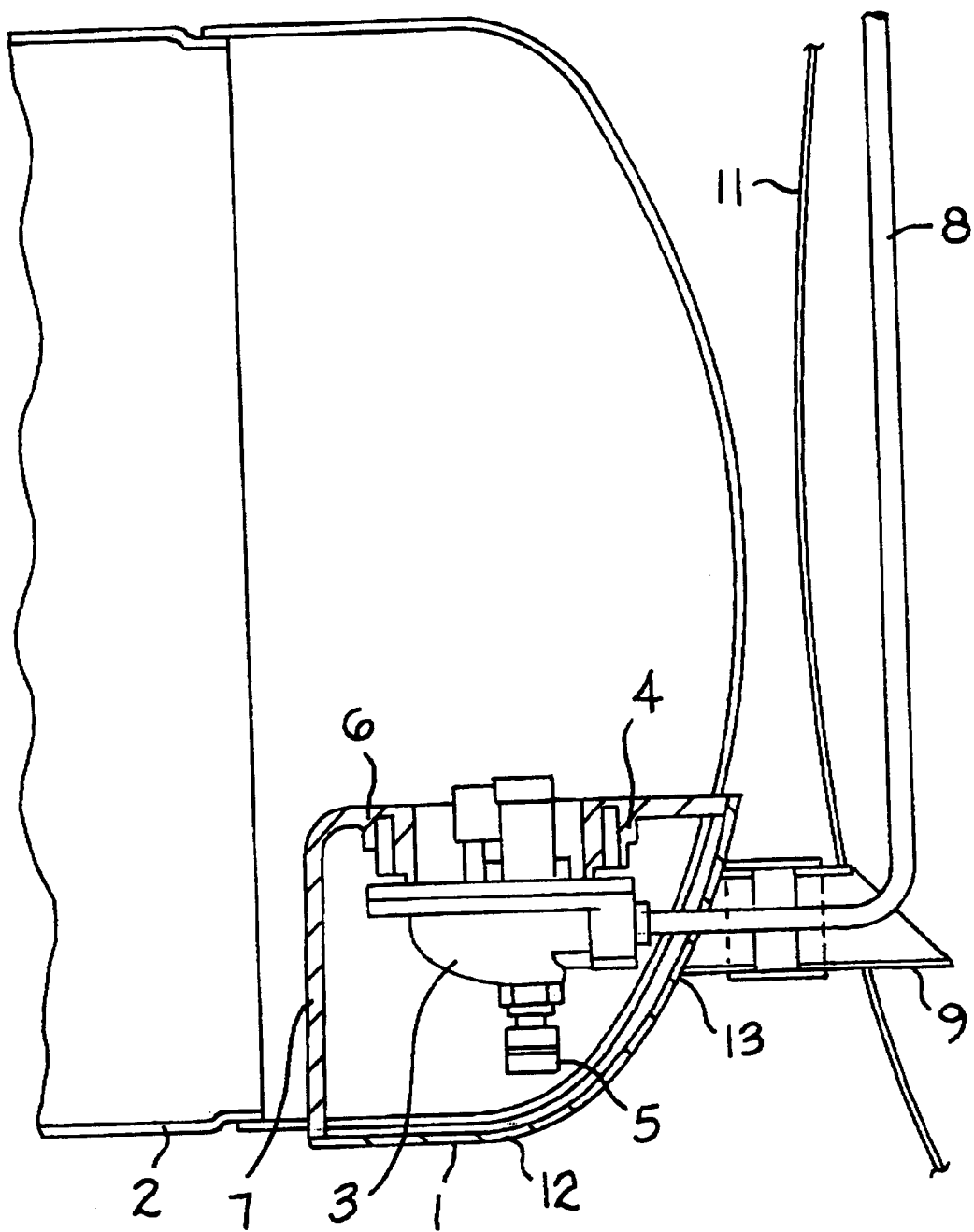
FIG. 1 shows a section plan of a preferred embodiment.

Referring to the drawings, and in particular to FIG. 1, the end 1 of the tank 2 is provided with a cavity 3 housing the ring 4, or the rings in the case of the tank designed for the foreign market, for the valve group or valves 5. Said valve group ring or rings is/are shaped in such a manner as to fit perfectly inside the cavity.

The cavity will preferably have walls 6 and 7 placed at right angles and is located at the curved end 1 of the tank 2 so that even after the valve group 5 has been installed it is perfectly flush-mounted with the surface of end 1 of the tank 2.

The pipes 8 exit from the valve group and wheelhouse 11 through the passage 9, shaped like the mouthpiece of a flute, and made suitably airtight by means of silicone or any similar substance 10. An airtight cap 12, hinged at 13 so that may be opened for inspection purposes and shaped so as to be flush-mounted with the cylinder end, closes the valve group 5, or the valves, in the case of the embodiment designed for the foreign market, thus forming an airtight chamber.

Figure 3:
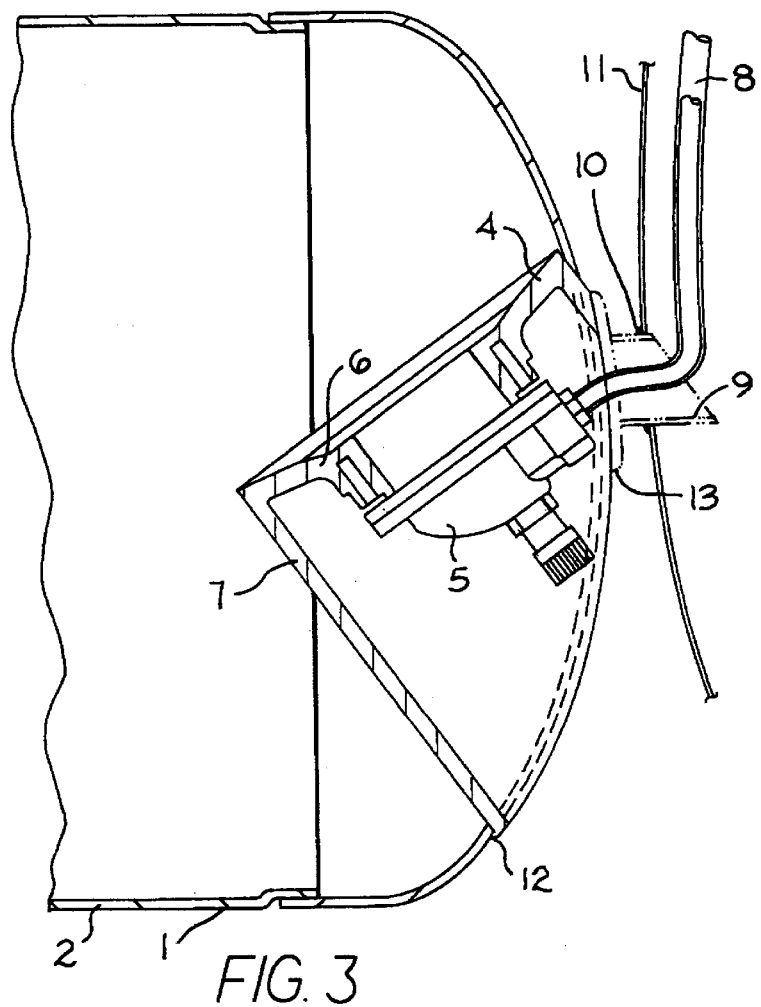
FIG. 3 shows a section plan of the side of an alternative embodiment of the tank with the valve group housing and valve group.
Figure 4:
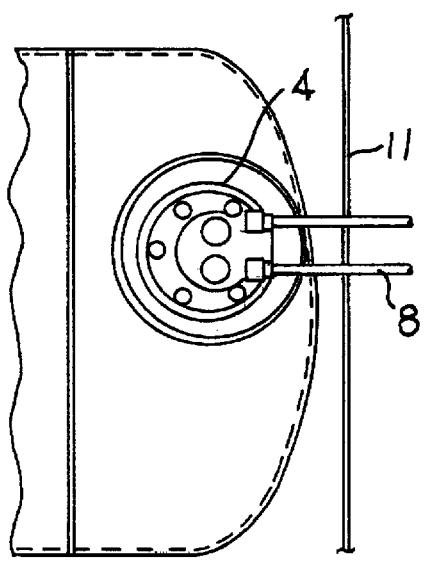
FIG. 4 shows a front view of the valve group housing and of the ring with the installed valve group.

As previously mentioned, the cavity 3 at one end of the cylinder 1 may be located in different positions, with regard to the previously described FIG. 1; FIG. 3, for example, shows an alternative embodiment where the cavity has been rotated so that the perpendicular walls 6 and 7 form an angle with the horizontal and vertical axis of the cylindrical tank.

Figure 2:
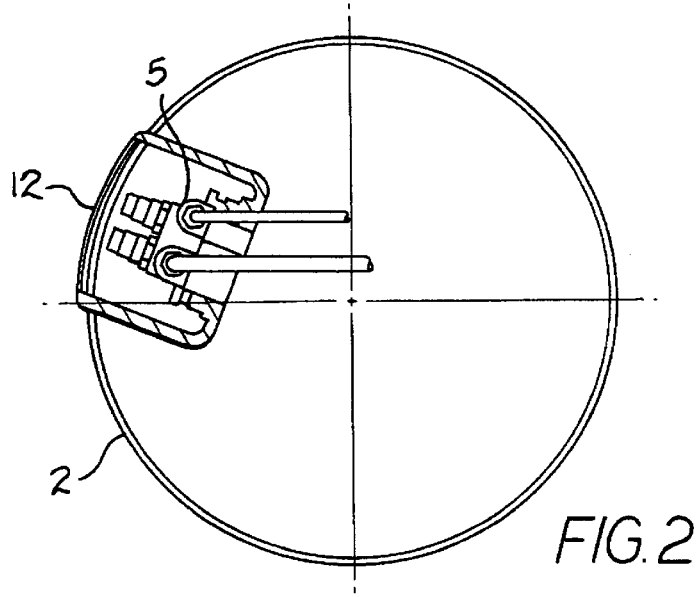
FIG. 2 shows a front section of the valve group ring.

FIGS. 2 and 3 show how the cavity housing the valve group is positioned with regard to the tank diameter, in this case also the airtight cap 12 is shaped so as to be flush-mounted with the tank.

Figure 8:
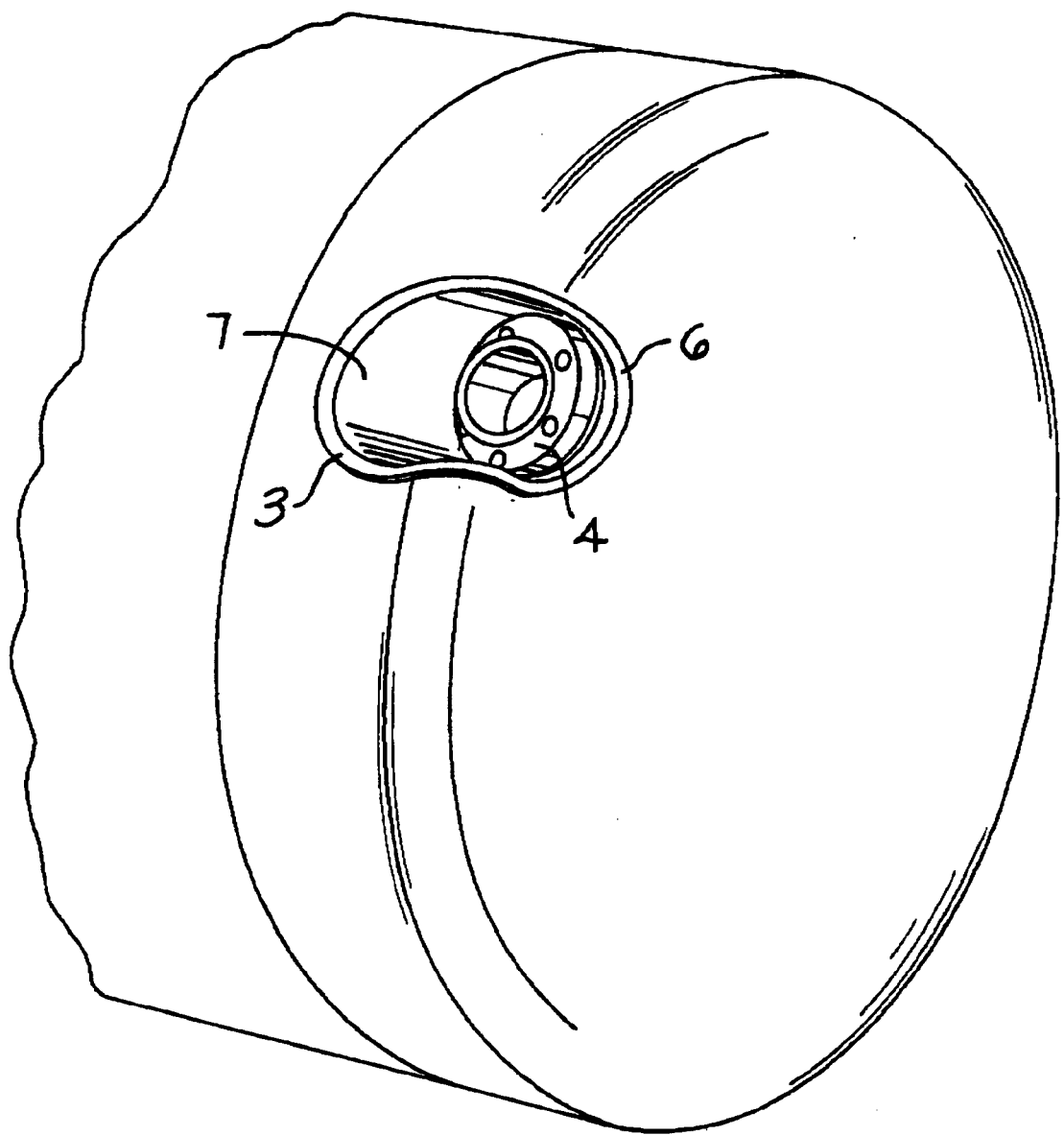
FIG. 8 shows a projection of the valve group ring.

FIG. 8 shows a projection of the tank with the cavity housing the valve group ring 4 and it is clear that the valve group ring and the valve group itself no longer project outside the tank, thus taking up practically no space at all.

Figure 9:
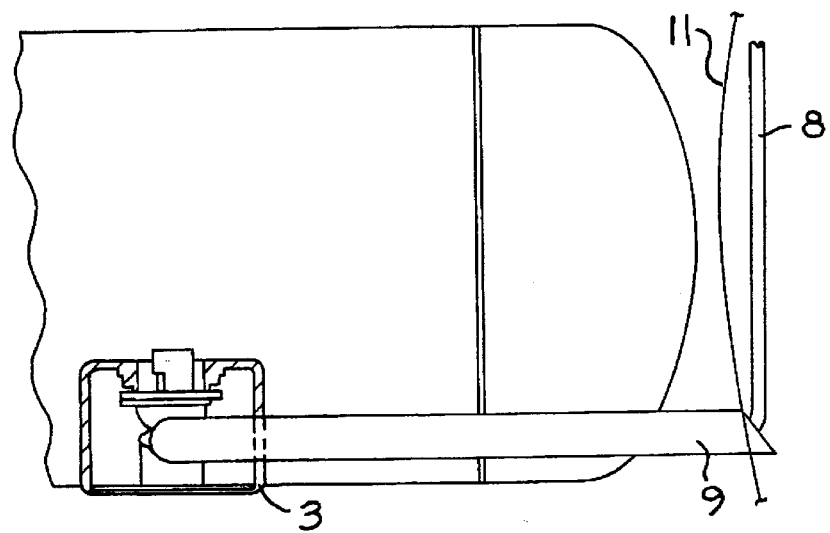
FIG. 9 shows a section plan of an alternative embodiment.
Figure 10:
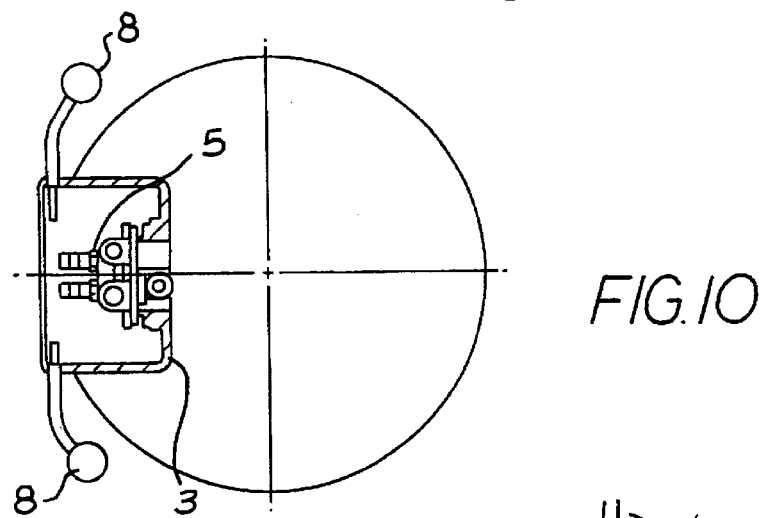
FIG. 10 shows a side section of the alternative embodiment
Figure 11:
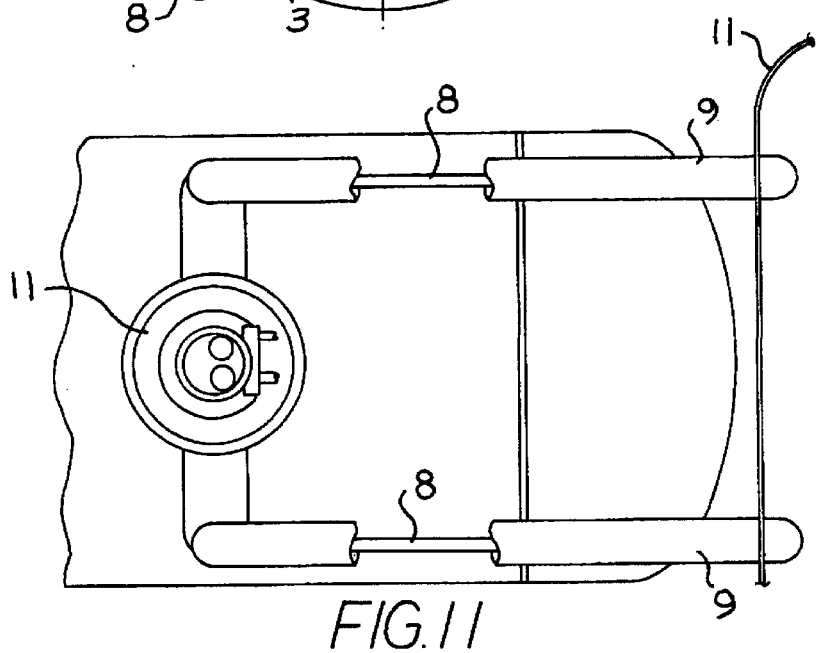
FIG. 11 shows a front view of the alternative embodiment shown in FIGS. 9 and 10.
Figure 12:
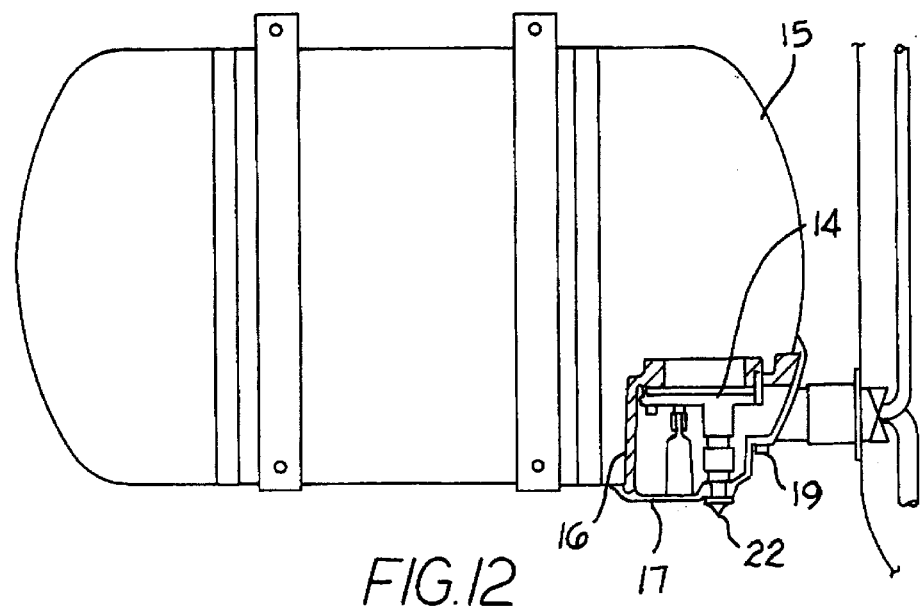
FIG. 12 shows a cross-section of a further embodiment of the tank and the valve group housing.
Figure 13:
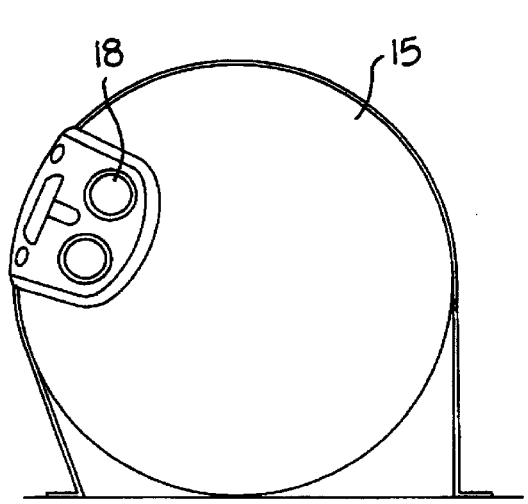
FIG. 13 shows a lateral section of the embodiment under FIG. 12.
Figure 14:
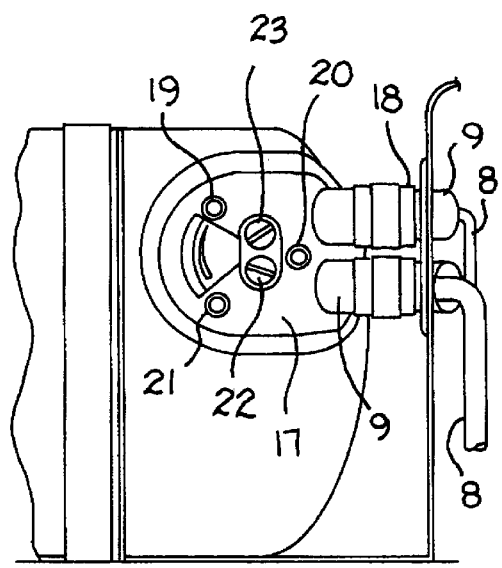
FIG. 14 shows a front view of the embodiment under FIG. 12.
Figure 15:
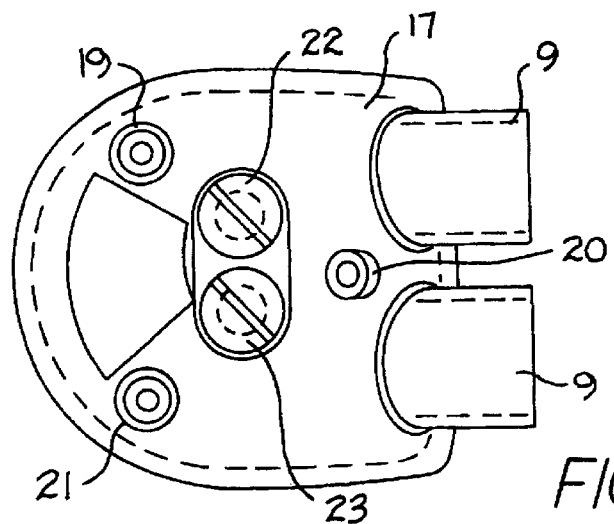
FIG. 15 shows a front view of the valve group and of the polycarbonate cover of the embodiment under FIG. 12.
Figure 16:
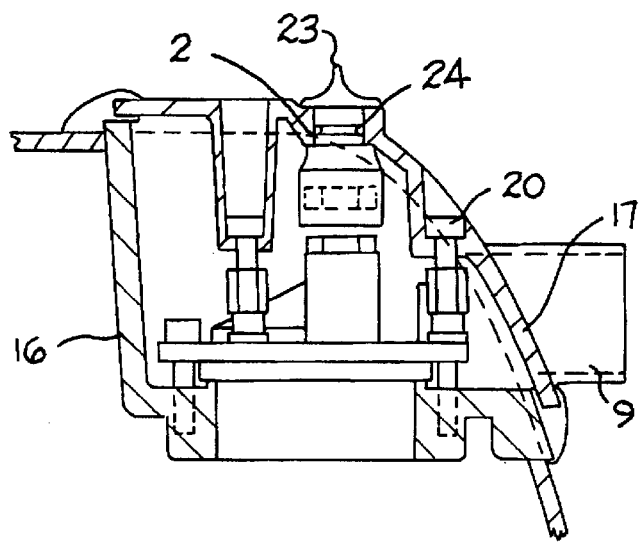
FIG. 16 shows a cross-section of the valve group of the embodiment under FIG. 12.

FIGS. 9 and 11 show a further embodiment where the cavity housing the valve group ring and the valve group, or valve rings and valves, is located at the side of the cylindrical tank, in the same position in which the valve group 5 or the valves are usually placed. In this case, the cavity 3 has a regular shape and the two pipes 8, one for filling the tank and the other for fuel supply, run alongside of the tank (see FIGS. 10 and 11) and exit from the two passages 9 shaped like the mouthpiece of a flute. In this case also the cavity housing the valve group or valve is sealed by an airtight cap that may be opened for inspection purposes. The recessed position of the valve group 5 does away with all projecting parts, which, on the contrary, are generally present on traditional tanks.

The embodiment shown in FIGS. 12 to 17 has the valve group 14 housed in the specific housing 16 of the LPG tank 15. The housing 16 is closed by a polycarbonate cover 17 shaped exactly like the tank, so as to follow its contour, and provided with holes 18 out of which pass the supply and airtight chamber ventilation pipes; of holes and housings 19, 20 and 21 for the screws or other similar means for fastening the cover 17 to the valve group housing 14. In the middle of the cover 17, in an easily accessed position, there are two holes for the knobs 22 and 23 to be used for opening or closing the gas flow.

Figure 5:
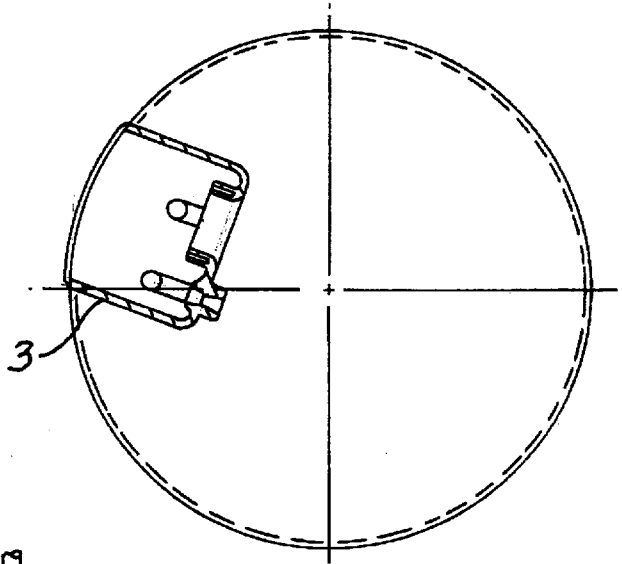
FIG. 5 shows a front view of an embodiment of the tank with the valve rings suitable for the foreign market.
Figure 6:
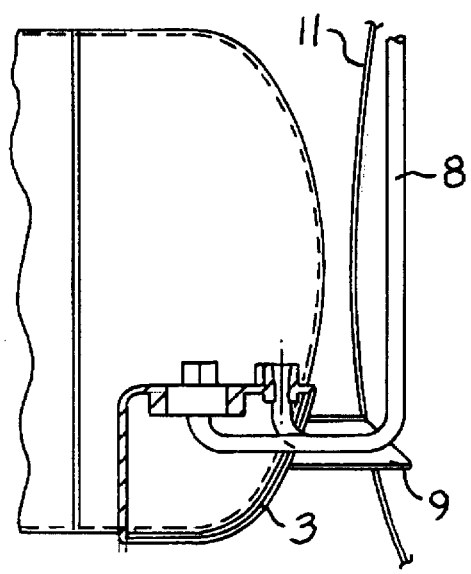
FIG. 6 shows a section plan of the valve rings on the embodiment suitable for the foreign market.
Figure 7:
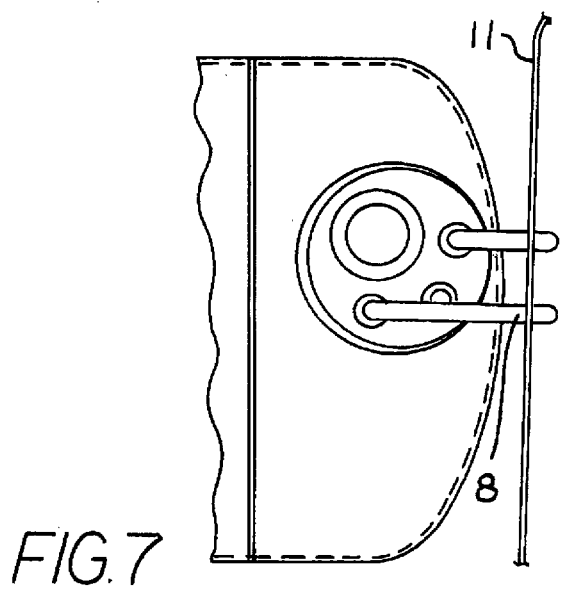
FIG. 7 shows a side view of the valve rings on the embodiment suitable for the foreign market.

The knobs 22 and 23, as may be seen in the FIG. 5, are provided with seals 24 of rubber or other suitable material, thus preventing any gas leaks, even the slightest, from the airtight chamber created inside the housing 16 and by the cover 17. The knobs 22 and 23 protrude from the surface of the tank just so that they may be easily turned in case of need, without having to open the cover 17 and without creating any troublesome projections or they may even be contained inside a specifically carved housing on the cover so as to avoid any projections whatsoever.

Figure 17:
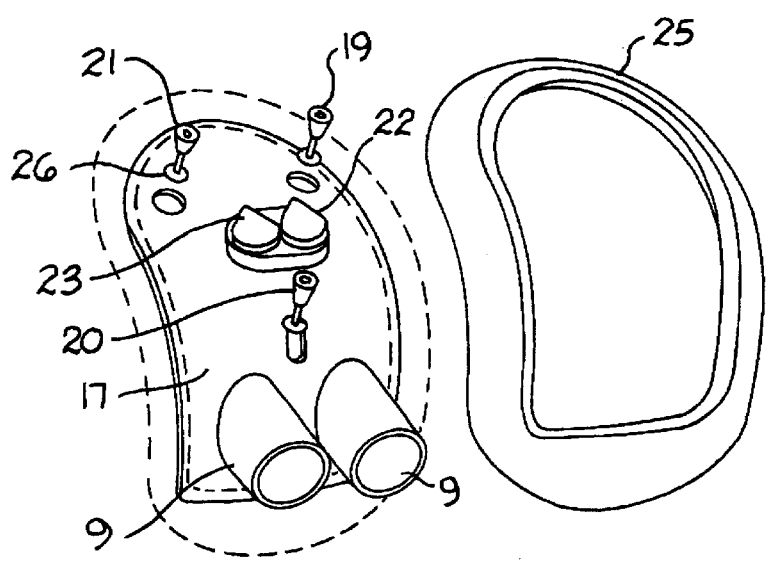
FIG. 17 shows in perspective the valve group cover and housing.

As may be seen in FIG. 17, the cover closing the valve group housing is also provided with a specific seal 25 preventing any gas leaks and the holes 19, 20 and 21 for fastening the transparent cover, made of polycarbonate or other similar material, to the valve group housing are also provided with adequate seals. Obviously, if so required for maintenance purposes, the cover may be speedily and easily removed simply by removing the fastening means 19, 20 and 21.

The advantages of the tank described herein are obvious in particular, the following must be highlighted: improved exploitation of the trunk, easy access to the valve group, even if the trunk is full, and easy installation, due to the fact that the pipes 8 required for filling the tank and supplying fuel to the engine exit from the vehicle almost immediately, thus reducing the pipe sections inside the trunk and the necessary maintenance.

I claim:

1. An LPG tank system particularly adapted for installation and safe operation in a closed compartment of a motor vehicle using propane as a fuel, including a generally cylindrical shaped LPG storage tank housing with two generally concave ends, comprising in combination:

a recessed cavity defined by an indentation in the sidewall of the storage tank housing near one end by a flange having two generally perpendicular walls, propane control means disposed upon one of the walls of said flange comprising at least one propane control valve, an air-tight cover disposed over the recessed cavity to form a portion of an exterior wall for said tank including valve adjustment means for manual access to said at least one control valve extending through said cover by way of an air-tight seal, a pipe for the introduction of fuel into the tank extending through said cover, a pipe for removing propane stored in the tank for operation of the motor vehicle extending through said cover, and sealing means disposed on the cover for maintaining the recessed cavity air tight.

2. An LPG tank system particularly adapted for installation and safe operation in a closed compartment of a motor vehicle using propane as a fuel, including a generally cylindrical shaped LPG storage tank housing with two generally concave ends, comprising in combination:

a recessed cavity defined in a sidewall of the storage tank housing near one end by an inserted flange having two generally perpendicular walls, propane control means disposed upon one of the walls of said flange comprising at least one propane control valve, a cover disposed over the recessed cavity generally conforming to the cylindrical shape of the tank confining the propane control means within said recessed cavity without projecting parts, said cover further including means for access to said at least one control valve, a pipe for the introduction of fuel into the tank extending through said cover, a pipe for transporting propane stored in the tank for operation of the motor vehicle extending through said cover, and sealing means disposed on the cover for maintaining the recessed cavity air tight.

3. The system of claim 2 wherein said closed compartment of said vehicle comprises a wheel housing, and an air tight passage way member surrounds a length of each of said pipes extending from said cover through the wheel housing to terminate outside the wheel housing in a mouth shaped like the mouthpiece of a flute, said mouth being covered with a protective element sealed to the pipes to form an air tight seal about the pipes extending therethrough.

4. The system of claim 2 wherein said flange has one wall disposed at approximately a 20° angle to a generatrix of the cylindrical tank.

5. The system of claim 2 wherein said at least one control valve have control knobs extending through sealed openings in said cover.

* * * * *